(12) United States Patent
Cutlip et al.

(10) Patent No.: US 7,688,438 B2
(45) Date of Patent: Mar. 30, 2010

(54) SCANNING SOLAR DIFFUSER RELATIVE REFLECTANCE MONITOR

(75) Inventors: Hansford H. Cutlip, Buellton, CA (US); Nelson W. Wallace, Ventura, CA (US)

(73) Assignee: Raytheon Company, Waltham, MA (US)

( * ) Notice: Subject to any disclaimer, the term of this patent is extended or adjusted under 35 U.S.C. 154(b) by 672 days.

(21) Appl. No.: 11/313,891

(22) Filed: Dec. 20, 2005

(65) Prior Publication Data

US 2007/0139736 A1    Jun. 21, 2007

(51) Int. Cl.
*G01J 1/10*    (2006.01)
(52) U.S. Cl. ........... 356/243.1; 356/241.1; 356/236; 250/228; 250/559.1; 358/504; 358/509
(58) Field of Classification Search ......... 356/241.1, 356/243.1, 236; 358/504, 509, 510; 250/228, 250/239, 559.1, 221
See application file for complete search history.

(56) References Cited

U.S. PATENT DOCUMENTS

| | | | | |
|---|---|---|---|---|
| 6,111,640 | A * | 8/2000 | Hedman et al. | 356/243.1 |
| 7,166,825 | B1 * | 1/2007 | Smith et al. | 356/446 |
| 7,321,424 | B2 * | 1/2008 | McCandless | 356/319 |

OTHER PUBLICATIONS

"Solar Diffuser", internet article, NASA MODIS, modis.gsfc.nasa.gov, printed Nov. 21, 2005, 1 pg.
"Solar Diffuser Stability Monitor", internet article, NASA MODIS, modis.gsfc.nasa.gov, printed Nov. 21, 2005, 2 pgs.
Moderate Resolution Imaging Spectroradiometer (MODIS), internet article, Raytheon.com, printed Nov. 21, 2005, 2 pgs.
Xiong X; Erives H, Xiong S; Xie X, Esposito J, Sun J; Barnes W: "Performance of Terra MODIS solar diffuser and solar diffuser stability monitor" Proc SPIE Int Soc Opt Eng.
Earth Observing Systems X, vol. 5882, Aug. 2, 2004 (Aug. 2, 2005). pp. 6270 XPoo2418265 San Diego CA United States Paragraph [0002]; fig 2.

* cited by examiner

*Primary Examiner*—Gregory J Toatley, Jr.
*Assistant Examiner*—Iyabo S Alli
(74) *Attorney, Agent, or Firm*—Pillsbury Winthrop Shaw Pittman, LLP (57) ABSTRACT

A device includes a housing, illumination means, a reflective plate, and a detector. The housing defines an aperture. The illumination means is for providing illumination (natural or artificial) along an optical axis that passes through the aperture. The reflective plate is movable, relative to the housing, between a retracted and a deployed position. The positions are defined so that during such movement, the optical axis traces a line across the reflective plate. The detector is aligned to detect illumination from the illumination means after light through the aperture is reflected from the reflective plate. A method is also described. The device is particularly suitable for moving the reflective plate temporarily in front of a pushbroom or whisk broom type sensor for calibration because the line traces across a first portion of the diffusing surface that is subject to sunlight degradation and a second portion that is always shielded from sunlight.

19 Claims, 8 Drawing Sheets

SCANNING SOLAR DIFFUSER RELATIVE REFLECTANCE MONITOR

FIELD OF THE INVENTION

The present invention relates generally to calibration of remote sensing imagers and radiometers. It is particularly related to solar diffuser assemblies that are used for such calibration in space-based satellites, vehicles, and other sensor-related deployments.

BACKGROUND

In the field of space-based imaging, optical sensors such as visible/infrared IR/microwave wavelength sensors and radiometers typically require routine calibration while in operation to ensure proper scaling of data returned from the sensor. Payload for a launch vehicle is an engineering concern for any space-based venture, so the calibration mechanisms generally are designed to be small in size and weight.

One known space based imaging system is termed the Moderate Resolution Imaging Spectroradiometer MODIS. Another is termed Visible/Infrared Imager/Radiometer Suite VIIRS, but MODIS is explained herein for background. MODIS measures the earth's land, oceans, and atmosphere from NASA's TERRA satellite, which circles along a polar orbit. Every one to two days, MODIS views the earth's surface in its entirety, collecting data in thirty six different spectral bands ranging from visible to long range IR. The breadth of wavelength imaging and of data acquired requires precise calibration of the MODIS sensing equipment, for which a solar diffuser SD is used for calibration in the visible light range.

Solar diffusers typically use high reflectance Lambertian plates by which to provide a diffuse source of known luminance to the imaging sensors for calibration. MODIS uses a space grade, Spectralon® material as its solar diffuser, a proprietary thermoplastic formulation of Labsphere, Inc. of North Sutton, N.H. Over time, the reflectance of these plates change due to a number of factors, most of which are related to exposure of the plate to solar irradiance. Once the reflectance of the reference plate changes, calibration relies on knowing the extent of that change. The MODIS sensors scan the reference plate, providing a known illumination as an input to the sensors from which they may be calibrated. To maintain calibration precision, changes in the plate's reflectance must be measured and quantified as it degrades over time from to solar irradiance.

Figure 1:
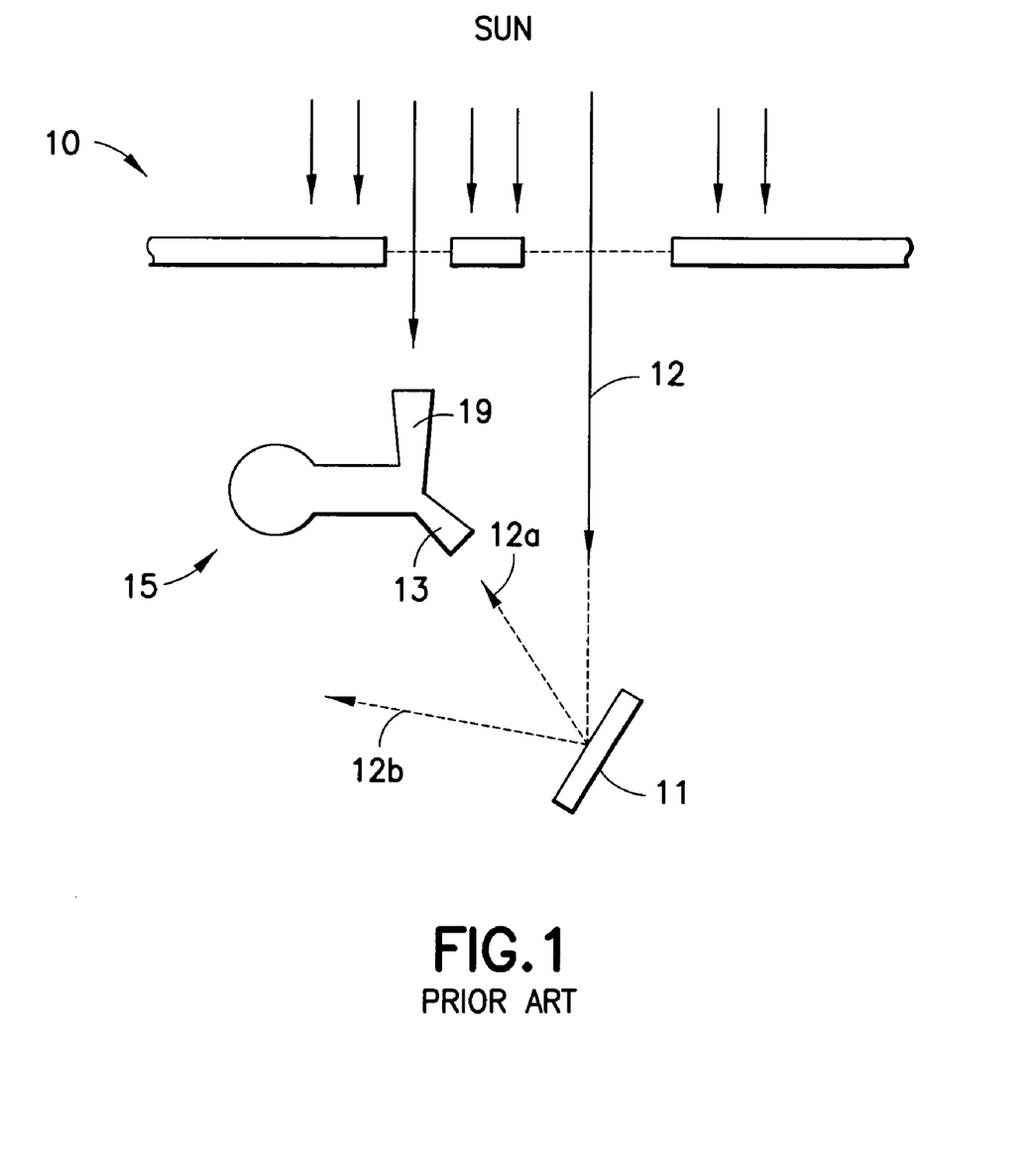
FIG. 1A is a schematic diagram of a prior art solar diffuser and solar diffuser stability monitor in the MODIS system.
FIG. 1B is an orbital track superimposed over the earth, partially showing lines traces by an optical axis of a rotating sensor such as used in MODIS.
FIG. 1C is similar to FIG. 1B but showing a line traced by a whisk broom type sensor.

FIG. 1A is prior art schematic diagram of the MODIS calibration system 10. The solar diffuser 11 receives direct sunlight 12 and reflects it into a reflected input port 13 of a Solar Diffuser Stability Monitor SDSM 15 along a first reflected path 12a, and to the sensors (not shown) along a second reflected path 12b. The SDSM 15 compares the reflected beam received at the reflected input port 13 to direct sunlight received at a direct input port 19 to determine true reflectance of the SD 11. When the sensor scans along the second path 12b and views the SD 11, the input to the sensor is known from the sunlight intensity and the measured reflectance of the SD 11.

Figure 1B:
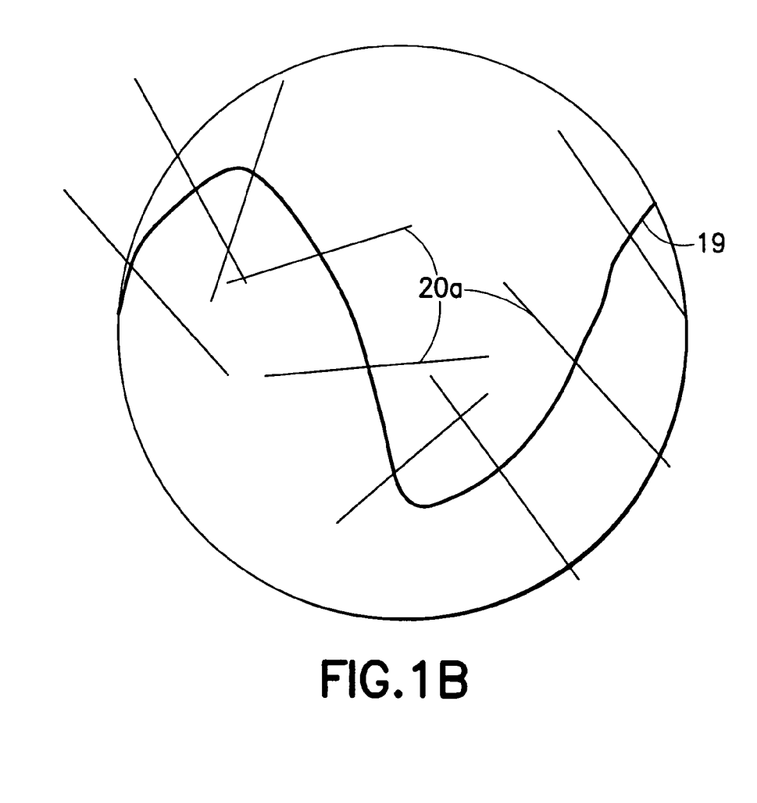

FIG. 1B shows an orbital path 19 of a vehicle such as that carrying MODIS 10 superimposed over a plan view of the earth. The MODIS sensors rotate 360° about an axis substantially aligned with the orbital path 19. The lines across which the one MODIS sensor scans, traced by the sensor optical axis, are shown partially as reference numbers 20a, the thin lines that cross the orbital path near the perpendicular. Note that the illustrated scan lines 20a are abbreviated; the actual MODIS sensors scan continuously and only scan the earth's surface during a portion of each 360° rotation, so the illustrated scan lines represent only one sensor. When facing the earth, the sensors collect data. When facing away from the earth and into the space-based vehicle, the MODIS sensor scans across the solar diffuser along the second path 12b (FIG. 1A). Because the sensors scan the SD 11 on each 360° rotation (about every 2-3 minutes), the SD 11 is continually exposed to sunlight (excepting those times when sunlight does not align with the SD 11).

Figure 1C:
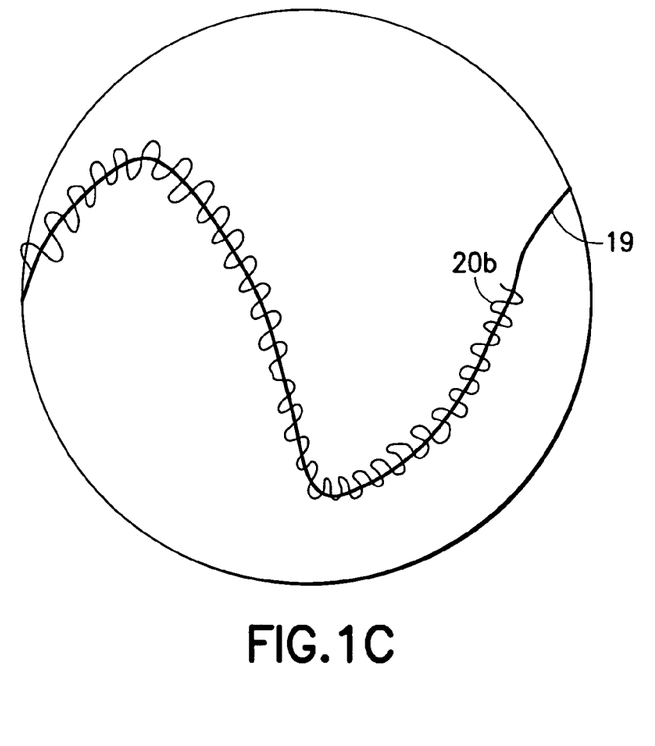

FIG. 1C illustrates the same orbital path 19, but shows the scan track of what is commonly termed a "whisk broom" sensor. Rather than rotate 360° as in MODIS, the whisk broom sensors always align their optical axis with the earth's surface (or other target) but scan from side to side to a limited extent in order to collect data from the periphery of the orbital track 19. The track scanned by a whisk broom type sensor is shown in FIG. 1C as a sine-type track 20b crossing the orbital path 19, and may be confined close to the track 19 or vary widely from it. Of course, the sensor may scan along a similar path 20b offset from the actual orbital path 19 rather than superimposed over it, depending upon how the sensor is mounted in the orbiting vehicle. Similar to the whisk broom type sensor is a "push broom" type sensor, which does not scan side to side but rather looks always at the target (earth's surface) along the orbital track or at a fixed offset therefrom.

Unlike the rotating MODIS sensors that change their field of view to take in the SD 11, calibration is performed on both whisk broom and push broom type sensors by physically interposing the SD between the sensor and its target. While calibration is performed much less frequently on whisk or push broom sensors as compared to MODIS or other rotational type sensors (typically spanning weeks or months as opposed to MODIS' every few minutes), a risk arises should the latter SD apparatus malfunction while positioned between the sensor and the target. Malfunctioning in that position causes the push broom type sensor to be unable to see beyond the SD, and render it unusable for practical purposes. A similar malfunction with a whisk broom type sensor may still allow the scanning whisk broom sensor to scan aside the malfunctioning SD for a portion of its scan, but the data it collects would be largely reduced in volume. Risk of a malfunctioning SD is to be minimized, as space-based repairs are difficult, costly, and often not practically viable.

What is needed in the art is a calibration system for a sensing system that relies on movement of the solar diffuser that provides a more robust design capable of error free operation over a substantial period of time. The invention is particularly well suited for sensor systems that require solar diffusers that are interposed between the sensor and the target for calibration, such as whisk or push broom type sensors.

SUMMARY

In accordance with one embodiment of the invention is a device that includes a housing, an illumination means, a reflective plate, and a detector. The housing defines an aperture. The illumination means is for providing illumination along an optical path that source passes through the aperture. The illumination means may be, for example, an artificial light source aligned with the aperture or a waveguide (e.g., fiber optic strand) that re-directs sunlight through the aperture. The reflective plate is movable, relative to the housing, between a retracted and a deployed position. The positions are defined so that during such movement, the optical axis traces a line across the reflective plate. The detector is aligned to detect illumination from the illumination means after being reflected from the reflective plate.

In accordance with another embodiment of this invention there is provided a method of calibrating reflectance from a surface. In the method, a first light beam is directed through an aperture. While the first light beam is being so directed, a reflective surface is moved relative to the aperture, and a characteristic of the reflective surface is quantized from a second light beam that is reflected from the reflective surface. Then, at least two quantized characteristics are compared. In a non-limiting embodiment, one quantized characteristic is representative of a first portion of the reflective surface, and another quantized characteristic is representative of a second portion of the reflective surface.

In accordance with yet another embodiment of this invention is an apparatus that includes reflecting means, means for directing visible light through an aperture, blocking means, and kinetic means. The reflecting means defines a reflective surface area. The blocking means is for blocking at least visible light, and the blocking means further defines the aperture. The aperture lies between the means for directing light and the reflecting means. The means for directing light directs light through the aperture toward the reflective surface area of the reflecting means. The kinetic means is for moving the reflecting means relative to the blocking means between a first position and a second position. The first position is characterized in that the blocking means overlies only a first portion of the reflective surface area, the second position is characterized in that the blocking means overlies greater than the first portion, and overlying is characterized from the position of the illumination means. The means for directing visible light may be, for example, an artificial illumination source mounted so as to be aligned with the aperture, or a waveguide for redirecting sunlight through the aperture.

BRIEF DESCRIPTION OF THE DRAWINGS

The present invention may be appreciated when the following text is read with reference to the following drawing figures.

DETAILED DESCRIPTION

The invention takes a different design approach for a solar diffuser calibration system than that evident in the prior art SDSM/SD arrangement detailed above. For brevity of description, the illustrated embodiments are termed a Scanning Solar Diffuser Relative Reflectance Monitor SSDRRM. Some significant differences include that the SDSM only uses direct sunlight as a reference, whereas the SSDRRM can use either an artificial light source or the sun; the SDSM relies on a fixed spatial relation between itself and the solar diffuser, whereas in the SSDRRM the solar diffuser is moveable relative to the rest of the calibration apparatus; and that the SDSM occupies a relatively large space given the disparate shapes and orientations of the SDSM and the SD whereas the SSDRRM may occupy a lesser space when the housing and solar diffuser are closely coupled to one another, as will be described below.

As an overview before describing the drawings in detail, the SSDRRM embodiments described in detail below include a housing having an aperture, a light source directed through the aperture or means for directing light through the aperture, and a detector for detecting a reflected beam from the aperture. A reflective plate such as a solar diffuser is movably mounted to the housing so that it extends substantially beyond the housing in one position, and retracts behind or within it in another position. At least during an interim position where the solar diffuser is between the full extend/deployed and full retract positions with respect to the housing, a first light beam from the source (or means for directing light) passes through the aperture, reflects from the solar diffuser as a second light beam, and is measured by the detector. An important aspect is that even in the fully deployed position, a portion of the solar diffuser diffusing surface lies behind the housing, which shields that portion form solar degradation. This is a particularly important feature. That portion of the diffusing surface never exposed to sunlight exhibits a fixed and unchanging reflectance, by which degradation of the exposed diffusing surface and any changes in illumination from the light source itself may be determined. This feature eliminates in certain embodiments the need to compare SD reflectance to a direct sunlight input as shown in FIG. 1A for the SDSM/SD apparatus.

During transition of the SD between retracted and deployed positions, the light source 'scans' across the moving solar diffuser, tracing a line or swath across the reflective surface. That line or swath sweeps a portion of the surface that is exposed to direct sunlight when in the fully deployed position, and a portion of that surface that is always shielded by the housing from direct sunlight. In this manner, the detector reading from the always-shielded portion serves as a reference against which is compared the detector readings from other portions of the solar diffuser that are exposed to direct sunlight when deployed.

The illustrated embodiments of the SSDRRM are now described in detail. FIGS. 2A-2D illustrate an exemplary and preferred embodiment of the invention at various orientations of components between a retracted position (FIG. 2A) and a deployed position (FIG. 2D). The illustrated embodiments are exemplary and not limiting to the invention or the claims, as various design modifications may be suitable or advantageous with a variety of different host platforms. For example, while several mechanisms are shown for deploying and retracting the reflectance plate relative to a housing, other mechanisms may be readily substituted without departing from the essential teachings herein and the advances in the art that they represent. While the detector and light source are illustrated as disposed in a calibration box mounted to the housing, the text describes that such mounting is not an essential aspect. Other variances are contemplated and not foreclosed from the claims by illustrating what the inventors deem as the most advantageous embodiment.

Figure 2A:
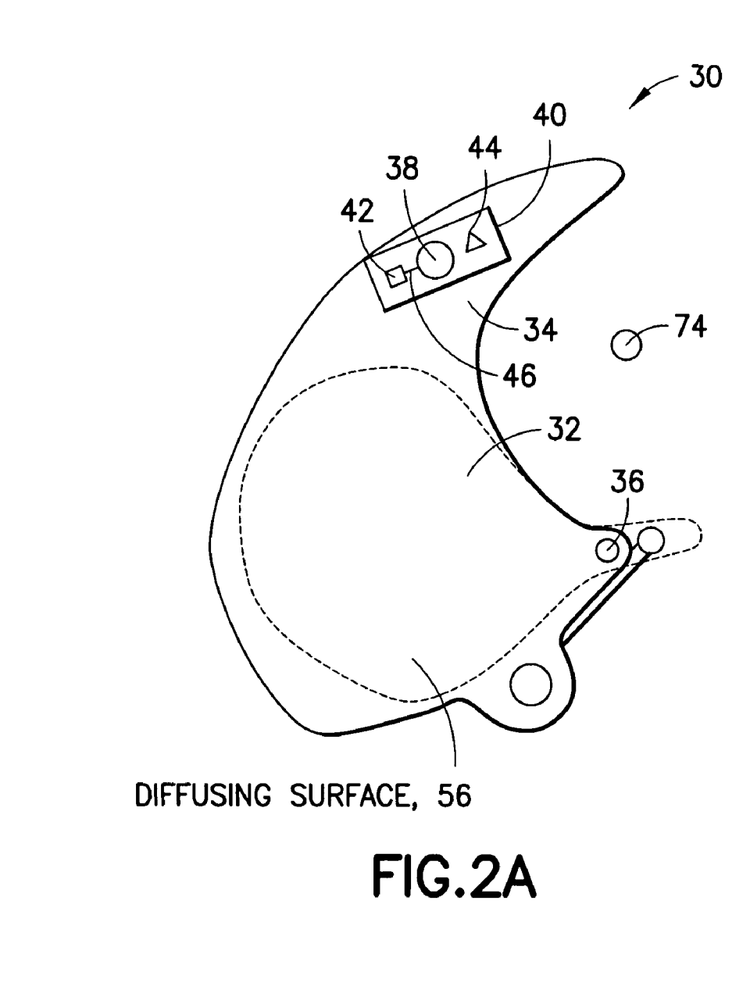
FIG. 2A is a plan view of a Scanning Solar Diffuser Relative Reflectance Monitor according to an embodiment of the invention, shown with the solar deflector in the fully retracted position.

The SSDRRM device 30 of FIG. 2A is in the retracted position, where a reflective plate 32 (shown in dashed outline) lies behind a housing 34 and is coupled thereto at a pivot axis 36. The reflective plate 32 includes a diffusing reflective surface 56. The housing defines an aperture 38 therethrough. A calibration box 40 is mounted in the foreground to the housing over the aperture 38. Within the calibration box 40 is an illumination source 42 and a detector 44. The illumination source 42 may be any artificial light source, preferably providing light across the entire visible light spectrum. An alternative embodiment is to use a fiber optic waveguide to pipe incident sunlight through the aperture and toward the diffusing surface. This eliminates the possibility of malfunctions in an artificial light source such as a white light LED. A mirror assembly to re-direct incident sunlight to the housing aperture 38 will function similarly, but such a mirror assembly is subject to malfunction should it be moveable to re-direct sunlight that is incident from different directions. While the aperture 38, illumination source 42, and detector 44 are illustrated in the Figures, the surface of the calibration box 40 facing the viewer in all drawings would obscure the aperture 38, illumination source 42, and detector 44 in all illustrated views for an actual embodiment.

Figure 2B:
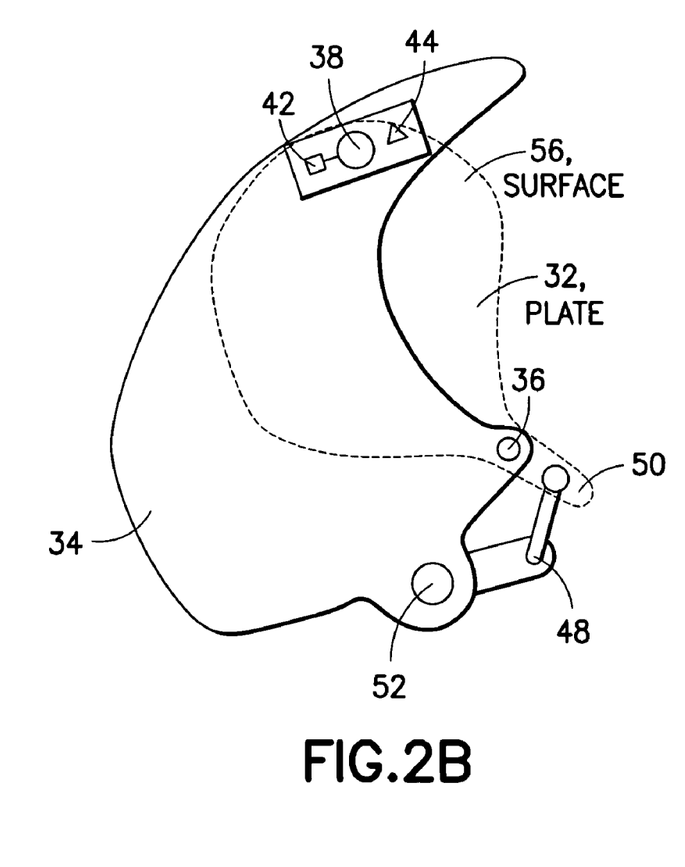
FIG. 2B is similar to FIG. 2A, but shown with the solar deflector in a position deployed approximately one third of its full swing.
Figure 2C:
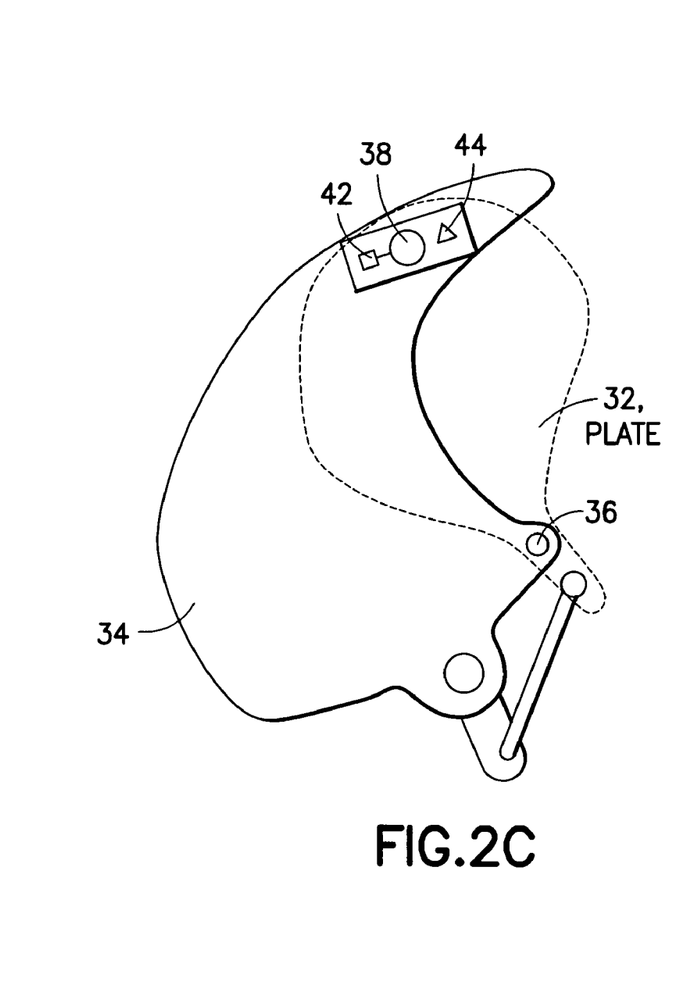
FIG. 2C is similar to FIG. 2A, but shown with the solar deflector in a position deployed approximately two thirds of its full swing.
Figure 2D:
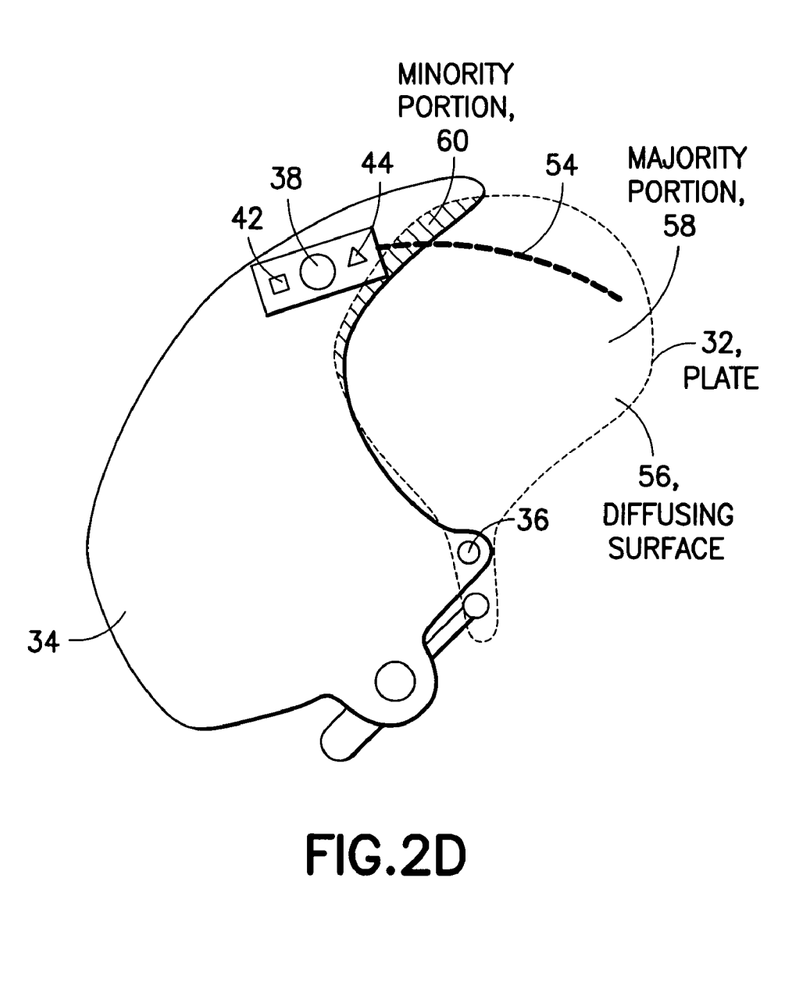
FIG. 2D is similar to FIG. 2A, but shown with the solar deflector in the fully deployed position.

An optical axis 46 (also termed a first light beam 45) from the illumination source 42 passes through the aperture 38. The term optical axis does not imply that the illumination source 42 is directional such as a laser; any light ray passing through the aperture 38 toward the diffusing surface 56 defines the relevant optical axis 46. When the reflective plate 32 is rotated about the pivot 36 to lie adjacent to (underneath) the aperture 38, as shown in FIGS. 2B-2C, a first light beam from the illumination source 42 along the optical axis 42 passes through the aperture 38, reflects as a second light beam from the diffuse Lambertian surface of the reflective plate 32 back toward the optical detector 44. For clarity of illustration, the drawing figures show a relatively wide spacing between the illumination source 42, the aperture 38, and the detector 44. Preferably, a substantial component of the optical axis 46 lies in the vertical plane, normal to the diffusing surface of the reflective plate 32 that faces the aperture 38, and normal to the drawings of FIGS. 2A-2D. This enables a more compact design, especially when spacing between the housing 34 and the reflective plate 32 is close (e.g., less than about three inches on average) when in the retracted position, also an advantageous design.

FIG. 2B illustrates relative disposition of the reflective plate 32/diffusing surface 56 and the housing 34 while in an intermediate position, about one third deployed. A pair of pivoted links 48, coupling a moment arm 50 of the reflective plate 32 to a power shaft 52 passing through the housing 34, are used as an exemplary mechanism to rotate the reflective plate 32 relative to the housing 34. An overcenter design may be used to lock the links 48 when in the retracted (FIG. 2A) and possibly even in the deployed (FIG. 2D) positions. The reflective plate 32 need not be massive, so any number of motors known in the art may provide rotational energy to the power shaft 52.

Note in FIG. 2B that the reflective plate 32 is now aligned with the aperture 38. Illumination of the illumination source 42 at this point provides a first light beam along the optical axis 46, through the aperture 38 to reflect as a second light beam from the diffusing surface 56 of the reflective plate 32 for quantification of the reflected beam at the detector 44. FIG. 2B does not represent a stationary position but a transitory one. Some embodiments may deem it advantageous to take measurements by the detector with the reflective plate 32 in a stationary position. One consideration for the period of time over which to take reflectance measurements is stability of the light source, if an artificial light source is used. Regardless, FIG. 2B represents that instant in time when a first light beam along the optical axis from the source 42 begins to track a line across the reflective plate 32. The line is not physical; it is an imaginary line defined by the optical axis 46 and movement of the reflective plate 32 between retracted and deployed positions. Where the reflective plate 32 rotates about the pivot axis 36, the line will be arcuate as in FIG. 2D with a radius matching the distance between the pivot point 36 and the aperture 38. Where the reflective plate 32 moves linearly with respect to the housing 34, the line will be straight as in FIG. 4.

FIG. 2C illustrates another relative disposition of the reflective plate 32/diffusing surface 56 and the housing 34 while in another intermediate position, about two thirds deployed and chronologically between that disposition shown in FIG. 2B and the deployed position shown in FIG. 2D. The further rotation of the reflective plate 32 about the pivot axis 36 extends the imaginary line 54 (shown as a bolded dashed line in FIG. 2D) traced by the optical axis 46 that was begun at FIG. 2B.

FIG. 2D illustrates the deployed position. With respect to the optical axis 46/first light beam which has a component substantially vertical to the drawing, the reflective plate 32 and the housing 34 are in a substantially abeam relation so that much less than half of the surface areas of their major facing surfaces overlie one another. The abeam and overlying relations are detailed below. FIG. 2D illustrates full deployment: the overcenter links 48 are locked at the full extent of reflector plate 32 rotation. Though not shown specifically for that portion behind the calibration box 40, the line 54 extends across the diffusing surface 56 of the reflective plate 32, that same surface 56 that is adjacent to the aperture 38. When in the deployed position, a majority portion 58 of that diffusing surface 56 lies abeam the housing 34 and a minority portion 60 underlies the housing 34 in a stacked relation, as illustrated and when viewed from a vantage point along the optical axis nearest the illumination source 42.

It is the deployed position of FIG. 2D at which the diffusing surface 56 is temporarily interposed between a sensor and its target for calibration of the sensor. While the majority portion 58 of the diffusing surface 56 is expected to be exposed to sunlight for only short periods of time and only when calibration is deemed necessary, some degradation of the Lambertian reflectance of that majority portion 58 is anticipated. The minority portion 60 is never exposed to direct sunlight as it is always protected by the housing, in the retracted, deployed, and all intermediate positions. Irradiance through the aperture 38 is shielded by the calibration box 40. The imaginary line 54 traced by the optical axis 46 spans both the majority portion 58 and the minority portion 60 of the diffusing surface 56. By measuring reflectance across the line 54 at the detector 44, a comparison may be made between that portion 58 exposed to solar irradiance (at least when in the deployed position) and that portion 60 that is always shielded from it. The detector 44 output may be coupled to readout circuitry, which execute in computer program software (embodied on some computer readable storage medium such as optical or electronic or electromagnetic) an algorithm to determine reflectance from the majority portion 58.

Figure 3:
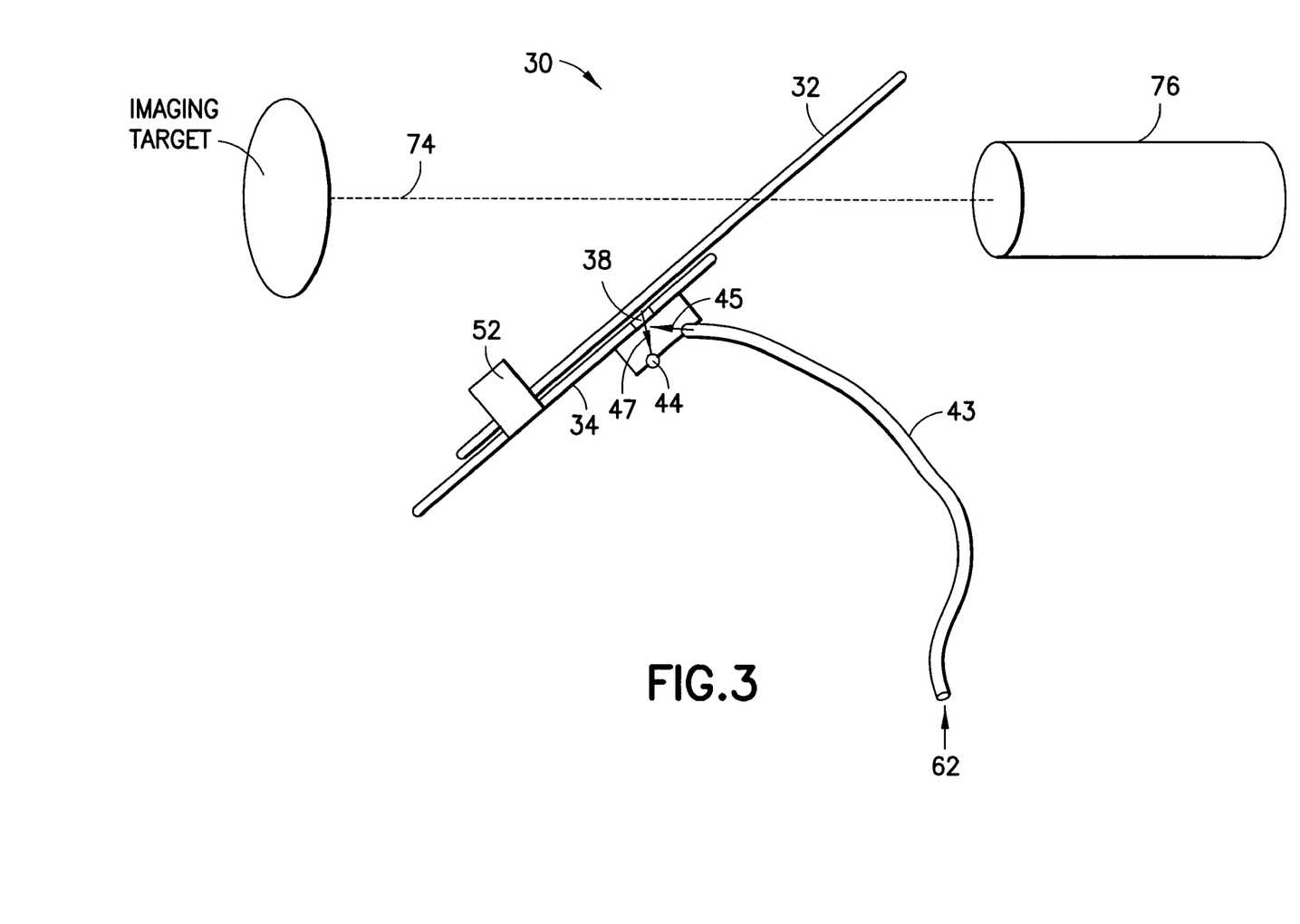
FIG. 3 is a side view similar to FIG. 2D in the context of a sensor, but showing an optical waveguide in place of an artificial illumination source.

FIG. 3 illustrates in side view the embodiment and disposition of FIG. 2D in context with a sensor 76 and its imaging target, with the exception that FIG. 3 illustrates a waveguide 43 in place of the artificial illumination source 42. The waveguide 43 may be a single optical fiber, a bundle of them, a square optical guide, or any manner of optical channels to re-direct visible light. Sunlight 62 strikes one end of the waveguide 43, which redirects that sunlight toward the aperture 38. The first light beam 45 emanates from the waveguide 43 and passes through the aperture 38 along the optical axis 46. After reflection from the diffusing surface 56, it becomes the second light beam 47 that is detected by the detector 44. When in the deployed position shown in FIG. 3, the diffusing surface 56 is interposed, along an optical axis 74 of the sensor 76, between the sensor 76 and its imaging target. When in the retracted position, the entirety of the reflective plate 32 is not so interposed and the sensor's field of view to the target is clear. For clarity, FIG. 2A depicts the sensor optical axis 74, which extends normal to the drawing page.

In, practice, the SSDRRM device 30 undergoes at least one cycle, from retracted to deployed and back to retracted positions, for calibration of the diffusing surface 56 of the reflective plate 32 only at those times that calibration is deemed necessary, as opposed to calibration every few minutes as in MODIS. The retracted/stowed position is the default position while in orbit, and it is anticipated that a half cycle, deployed to retracted or retracted to deployed positions, may span about ten seconds. Such a short time interval minimizes, to the point of being negligible, any variance in a reasonably stable (artificial) illumination source over the course of measurements by the detector. Measurements may be complete for calibration with only a half cycle, as the same line is traced through both half cycles of the full cycle.

One consideration in the relative disposition of the housing 34 and the reflective plate 32 is that the housing 34 and the reflective plate 32 lie in a substantially stacked relation when in the retracted position (FIG. 2A) when viewed along the optical axis 46. Substantially refers to adjacent major surface areas; where a major diffusing surface of the reflective plate 32 (that facing the aperture 38) faces a major surface of the housing 34, substantially relates to the proportion of the surface areas of those major surfaces that lie in a stacked relation while in the retracted position. Preferably, a substantially stacked relation exists when at least 60% of those surface areas are adjacent in a stacked relation, and most preferably 80% or greater, excluding the area of the aperture 38. When in the deployed position then (FIG. 2D), the reflective plate 32 and the housing 34 lie in a substantially abeam relation, such that at least 60% (and preferably at least 80%) of the above-described major surfaces do not overlie one another from the perspective of the optical axis 46, excluding the area of the aperture 38.

Figure 4:
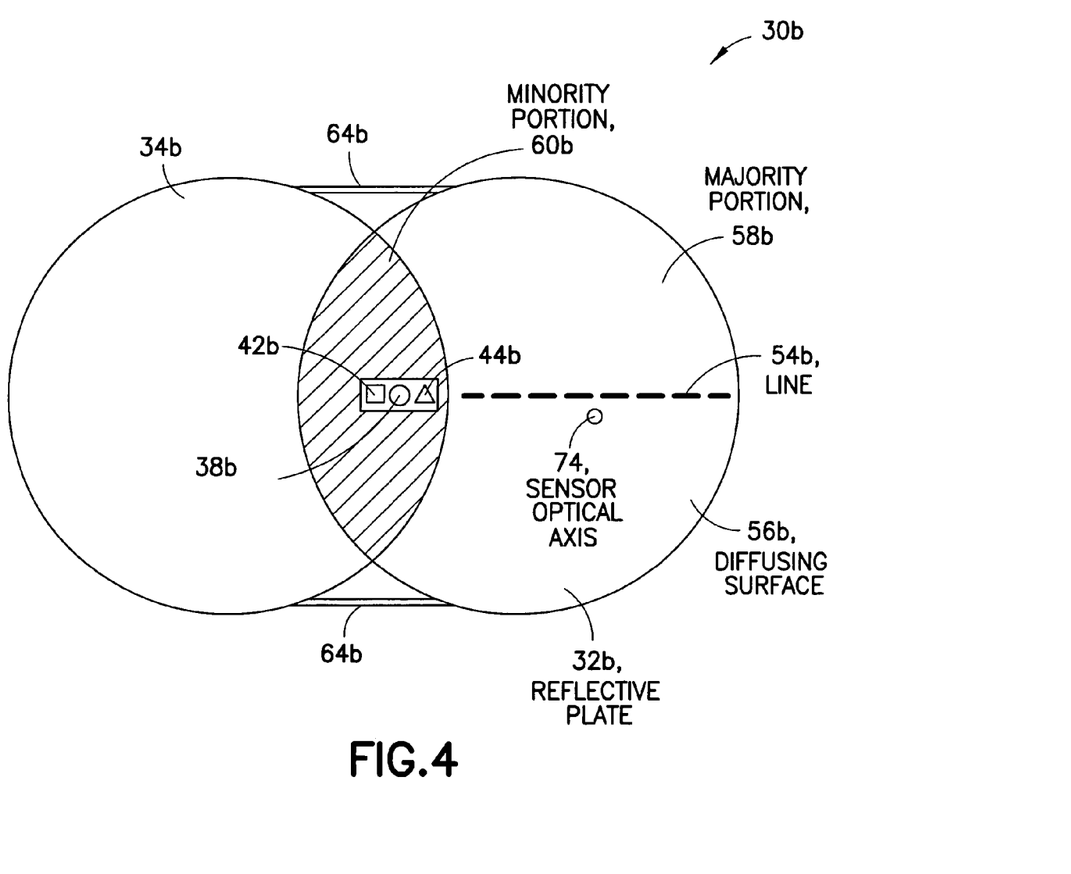
FIG. 4 is a plan view of a first alternative embodiment.
Figure 5:
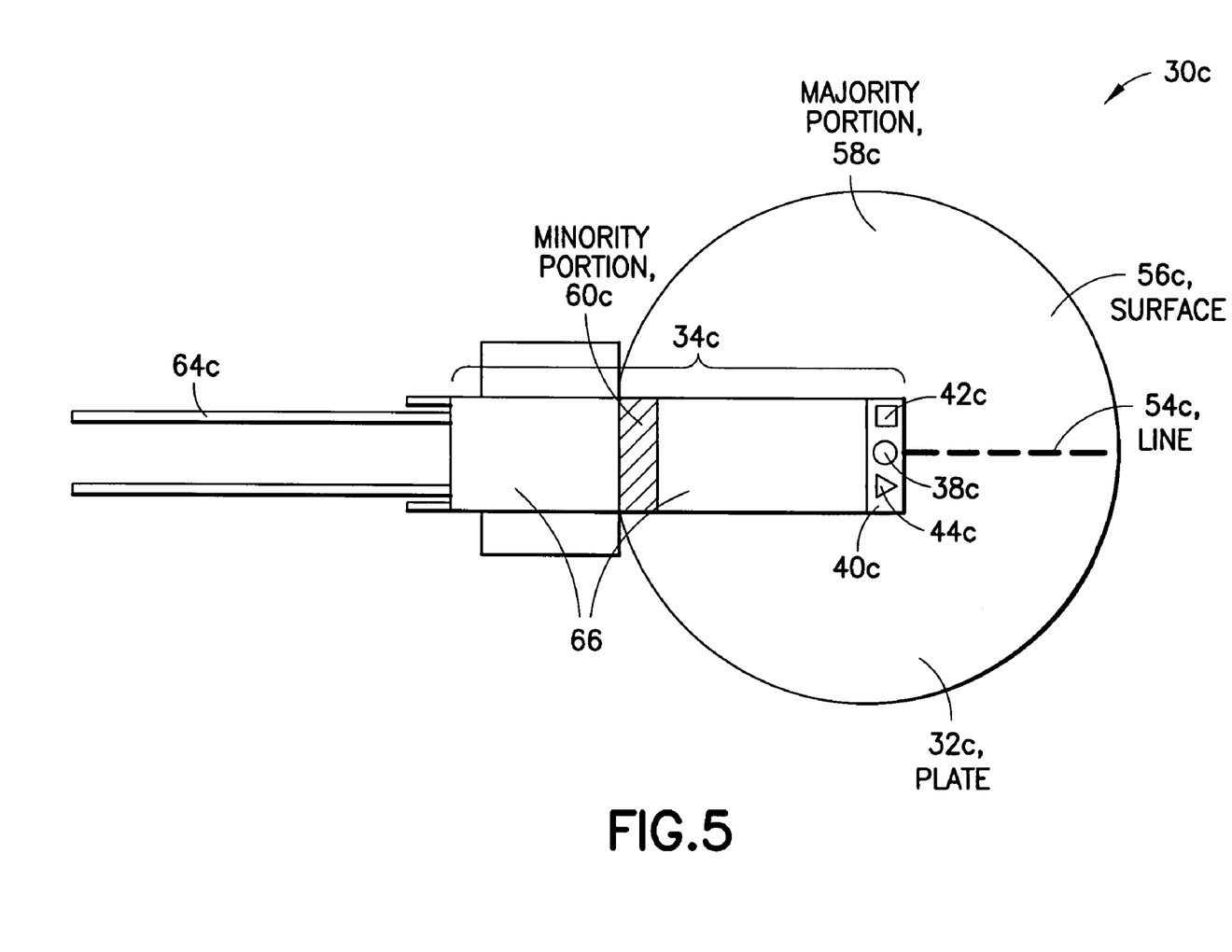
FIG. 5 is a plan view of a second alternative embodiment.

Alternative embodiments are shown in FIGS. 4 and 5. The pivoting embodiment in FIGS. 2A-2D is seen to be the best mode because its movement mechanism is seen to be the most mechanically robust, minimizing risk of malfunction that may occur while the reflective plate 32 is not in transit due to the overcenter lock aspect of the links 48.

FIG. 4 is similar in principle to FIGS. 2A-2D, except that reflective plate 32b moves relative to the housing 34b via a linear actuator which may move the reflective plate 32b along rails 64b. FIG. 4 shows the deployed position. A minority portion 60b of the diffusing surface 56b of the reflective plate 32b is shown as a hatched area that is not exposed to sunlight, which irradiates roughly from the viewer's position. In the retracted position, the reflective plate 32b lies completely underneath the housing 34b, and the rails 64 are fixed relative to the housing 34b. The calibration box 40b is mounted to the housing 34b over an aperture 38b. The illumination source 42b and detector 44b are as previously described. In the embodiment of FIG. 4, movement between the retracted and deployed positions traces a straight line 54b that crosses both the majority portion 58b and the minority portion 60b of the diffusing surface 56. The sensor optical axis 74 extends normal to the drawing page, and is shown as intersecting the majority portion 58b.

FIG. 5 uses a similar movement mechanism as in FIG. 4, but instead moves a portion of the housing 34c relative to the reflective plate 32c. As the diffusing surface 56c of FIG. 5 is stationary (unlike FIGS. 2A-2D and 4), it is seen as practical for sensors that exhibit a moveable field of view, such as the MODIS or even whisk broom type sensors detailed above rather than pushbroom type sensors. That FIG. 5 may be considered as moving only a portion of the housing 34c relative to the reflective plate 32c is irrelevant to the characteristic that the reflective plate and the housing and reflective plate move relative to one another. FIG. 5 shows an intermediate position between deployed and retracted. Linear movement along the rails 64c traces a straight line 54c that spans at least parts of the majority portion 58c and the minority portion 60c of the diffusing surface 58c of the reflective plate 32c. That line 54c lies under the aperture 38c over which the calibration box 40c is mounted. In the retracted position, the calibration box 40c overlies the minority portion 60c. The aperture 38c may be an entire face of the calibration box 40c, in which case the calibration box 40c forms part of the housing 34c when fixedly mounted thereto. To avoid exposing the minority portion 60c when the calibration box 40c does not overlie it (i.e., any position other than retracted), the housing 34c includes a blocking plate 66c that shields the minority portion 60c from sunlight impinging from the viewer's direction when the device 30c is in any position other than retracted. The blocking plate 66c may be rigid as shown, or a dark flexible cloth for weight and space savings. For use with a push broom or whisk broom type sensor, the entire apparatus of FIG. 5 would need to be moved temporarily between a sensor 76 and its target.

The rails 64b, 64c of either FIG. 4 or 5 may be telescopic for space savings with some loss of reliability, though in a space-based environment reliability typically outweighs other design considerations. Several drive apparatuses are suitable for use. One that is of particular interest is characterized by light weight, and uses a bi-directional rotational motor that pulls a cable in either direction. Pulleys at each end of the rails 64b, 64c enable the single motor to pull in either direction for deployment or retraction. However, the teachings of this invention are not limited for use only with a particular type of drive apparatus.

The housing 34 is preferably substantially planar across the faces illustrated in FIGS. 2A-2D and 4 and its obverse major surface that faces the diffusing surface 56 of the reflective plate 32. The housing 34 may be made of any of a number of materials, but one desirable characteristic is that those portions of the housing 34 that shield the diffusing surface 56 of the reflective plate 32 be substantially opaque to at least visible light, and that such opaqueness be stable over the expected time that the system may be usefully deployed in space. The housing may include a single plate, a pair of plates having spaced apart facing major surfaces between which the reflective plate 32 moves, or any of multiple variations thereof. Where the housing 34 is a pair of spaced apart plates as noted above, the relevant housing with respect to these teachings is that plate or portion through which the aperture 38 passes and to which the reflective plate 32 lies in a substantially abeam relation when in the deployed position.

The reflective plate 32 is also preferably planar, and having a major surface that is a diffusing surface 56 having Lambertian or near Lambertian properties. The diffusing surface 56 is that surface adjacent to the aperture 38 when moving between the retracted and deployed positions is. Spectralon® is considered to be a nearly true Lambertian surface, and is currently commercially available. Other materials exhibiting Lambertian or near Lambertian properties are also available.

It is advantageous but not essential that the illumination source 42 and the detector 44 be mounted to the housing 34, such as through the calibration box 40 as illustrated. Mounting the illumination source 42 and/or the detector 44 elsewhere, but still substantially aligned with the aperture 38 so that a light ray passes through the aperture 38, operates on an identical principle. This is seen as less advantageous when the illumination source 42 is broadband and omni-directional, as intensity is lost in any increased distance due to separation of the adjacent equipment on which the source 42/detector 44 are mounted and the aperture 38/reflective plate 32. That lost intensity may propagate as error in calculating reflectance of the Lambertian surface 56, a concern that holds true with embodiments using a waveguide 43.

Figure 6:
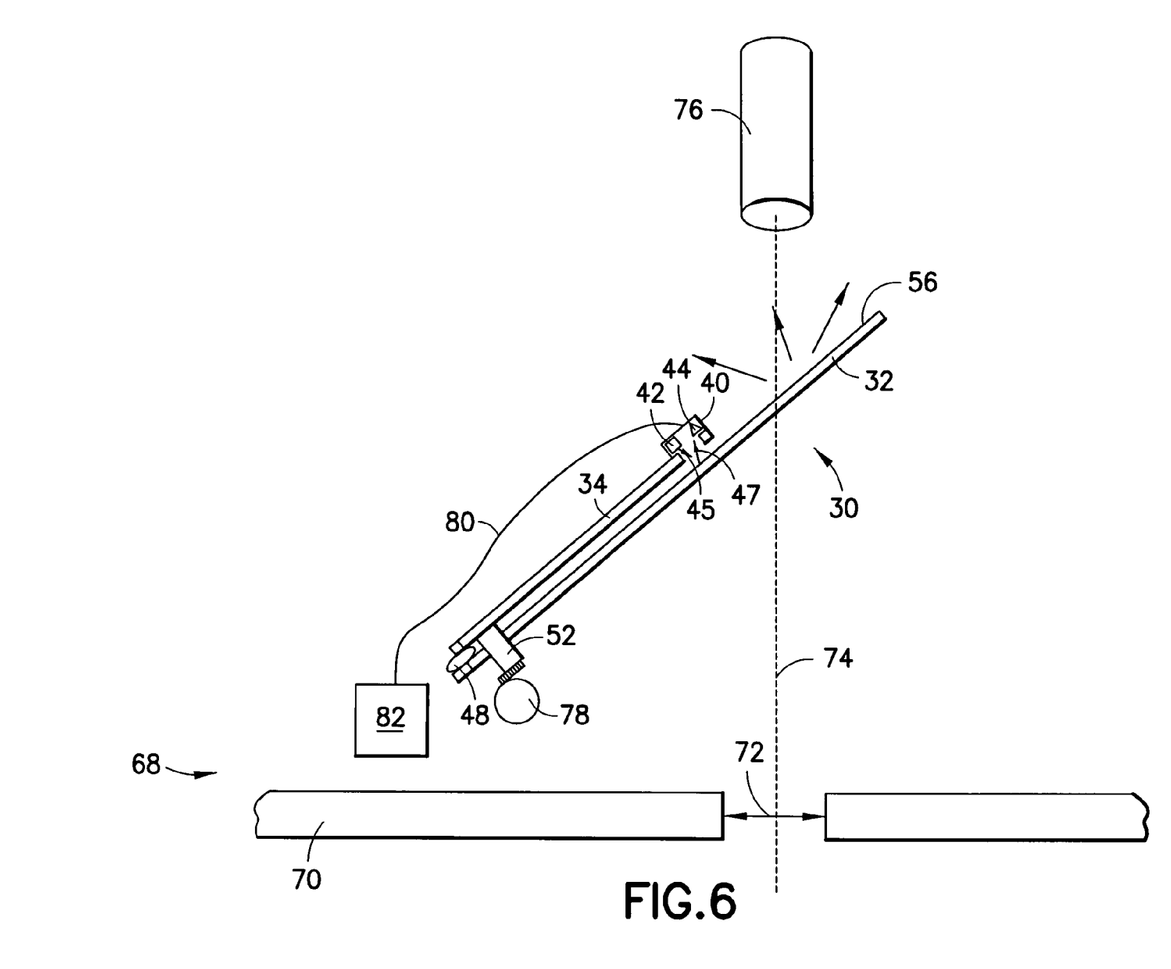
FIG. 6 is a schematic diagram of an embodiment of the invention disposed in a space-based vehicle.

FIG. 6 illustrates an embodiment of the invention disposed in a vehicle, such as an orbiting satellite 68 or other type of platform. The satellite 68 includes an exterior shell 70 through which penetrate a clear-to-field aperture 72 aligned with an optical axis 74 of a sensor 76. When the SSDRRM 30 is in the retracted position, the sensor 76 has an unobstructed view of the clear-to-field aperture 72 and may capture image data such as from the earth's surface. FIG. 6 illustrates the SSDRRM device 30 with the reflective plate 32 in the deployed position so that its diffusing surface 56 is interposed along the sensor optical axis 74 between the sensor 76 and the clear-to-field aperture 72, for calibration.

The particular embodiment of the SSDRRM 30 shown is that of FIGS. 2A-2D, with pivoted links 48 locking the reflective plate 32 in the deployed position relative to the housing 34. The power shaft 52 is driven by an electronic motor 78 via a series of reduction gears. The calibration box 40 is mounted to the side of the housing 40 that is opposite the reflective plate 32, and encompasses the illumination source 42 and the detector 44 while overlying the housing aperture 38. The first light beam 45 passes from the illumination source 42 to through the housing aperture 38. When in transit between retracted and deployed positions (or vice versa), the illumination source 42 is illuminated and the detector collects data from the second light beam 47 that is reflected from the diffusing surface 56 back through the housing aperture 38. Two housing apertures may instead be used without departing from these teachings: one for the first light beam 45, and a separate one for the reflected second light beam 47.

While calibrating, power is applied to the illumination source 42 and the reflective plate 32 is moved relative to the housing 34 as previously described. Data from the detector 44 is fed by a wired connection 80 to a computing means 82, such as a readout integrated circuit coupled to a processor for comparing data representative of the majority portion 58 of the diffusing surface 56 against the minority portion 60 of it. As detailed above, the majority portion 58 is exposed to sunlight while deployed, whereas in all positions the minority portion 60 is always shielded from sunlight by the housing 34. The data captured by the detector 44 quantizes visible light reflectance from at least those two portions 58, 60 of the diffusing surface 56, and preferably quantize reflectance at many points along the line 54 traced by the source optical axis 46 while the reflective plate 32 moves between retracted and deployed positions.

In the above manner, the light seen by the sensor 76 when viewing the diffusing surface 56 is known, and can be used to calibrate the sensor 76 for viewing a target through the clear-to-field aperture 72. While the majority portion 58 of the diffusing surface 56 is exposed to sunlight for only a short period of time (during calibrations when in the deployed position), degradation still occurs. That degradation may be quantified by reference to the minority portion 60 that is always shielded from sunlight exposure, in both the deployed and retracted positions, and used to correct reflectance from the majority portion 58 to determine exactly the amount of light incident on the sensor 76.

Although described in the context of particular embodiments, it will be apparent to those skilled in the art that a number of modifications and various changes to these teachings may occur. Thus, while several embodiments have been illustrated and detailed herein to describe the invention, it will be understood by those skilled in the art that certain modifications or changes may be made therein without departing from the scope and spirit of the invention as set forth above, or from the scope of the ensuing claims. Both the particular embodiments described and the environment in which the above description contemplates their use are to be considered as exemplary and not exhaustive of the scope of the invention or of the claims.

What is claimed is:

1. A device comprising:
   a housing defining an aperture;
   illumination means for providing illumination along an optical axis that passes through the aperture;
   a reflective plate movable between a retracted and a deployed position relative to the housing such that the optical axis traces a line across said reflective plate, in which the reflective plate lies behind or within the housing in the retracted position and extends substantially beyond the housing in the deployed position; and
   a detector aligned to detect illumination from the illumination means after being reflected from the reflective plate.

2. The device of claim 1, wherein a portion of the line but not the entire line remains adjacent to a major surface of the reflective plate in the retracted position, in the deployed position, and in at least one intermediary position therebetween.

3. The device of claim 1, wherein with respect to the optical axis, the housing and the reflective plate lie in a substantially stacked relation while in the retracted position, and the housing and the reflective plate lie in a substantially abeam relation while in the deployed position.

4. The device of claim 1, wherein the reflective plate defines a diffusing surface facing said aperture.

5. The device of claim 4, wherein the diffusing surface is substantially Lambertian.

6. The device of claim 1, wherein the illumination means comprises an artificial illumination source.

7. The device of claim 1, wherein the reflective plate is rotationally movable relative to the housing.

8. The device of claim 1, wherein the illumination means comprises an optical waveguide for re-directing incident sunlight through the aperture.

9. The device of claim 1, disposed within a vehicle that comprises a sensor and an exterior shell defining a clear-to-field aperture; wherein said device is configured such that the reflective plate in the deployed position, but not in the retracted position, is interposed between the clear-to-field aperture and the sensor along an optical axis defined by the sensor.

10. A method of calibrating reflectance from a surface, comprising:
  directing a first light beam through a housing aperture;
  while the first light beam is directed through the aperture, moving a reflective surface relative to the aperture between a retracted position in which the reflective surface lies behind or within a housing and a deployed position in which the reflective plate extends substantially beyond the housing, and quantizing a characteristic of the reflective surface from a second light beam that is reflected from the reflective surface; and
  comparing the quantized characteristics that are representative of a first and a second portion of the reflective surface.

11. The method of claim 10, wherein the quantized characteristic is reflectance and the reflective surface comprises a diffusing surface.

12. The method of claim 10, wherein the housing that defines the aperture overlies the first portion of the reflective surface throughout the entire moving of the reflective surface relative to the aperture.

13. The method of claim 10, wherein moving the reflective surface relative to the aperture comprises rotating the reflective surface relative to the aperture.

14. The method of claim 10, wherein directing a first light beam comprises re-directing incident sunlight toward the aperture by an optical waveguide.

15. An apparatus comprising:
  reflecting means defining a reflective surface area;
  means for directing visible light through an aperture and toward the reflective surface area;
  a housing for blocking at least visible light and defining the aperture, said aperture between the means for directing and the reflecting means; and
  kinetic means for moving the reflecting means relative to the housing between a first position in which the reflective means lies behind or within the housing, and a second position wherein the reflective means extends substantially beyond the housing.

16. The apparatus of claim 15, wherein the means for directing visible light comprises an artificial illumination source that is coupled to the housing and aligned with the aperture; the reflecting means comprises a thermoplastic material and the reflective surface area is defined by a diffusing surface thereof; the kinetic means comprises a motor for driving pivoted links via a power shaft, said pivoted links coupling a moment arm extending from said thermoplastic material to the power shaft that extends through said housing.

17. The apparatus of claim 15, further comprising: detecting means for detecting light from the means for directing after light from the means for directing is reflected from the reflecting means.

18. The apparatus of claim 15, wherein the first portion comprises the housing overlying less than half of the reflective surface area, and the housing overlies more than half of the reflective surface while in the second position.

19. The apparatus of claim 15, wherein the means for directing visible light comprises a waveguide for re-directing incident sunlight toward the aperture.

* * * * *